April 21, 1953     H. D. G. SCHEFFER     2,635,856
MASONRY DRILL
Filed May 27, 1949
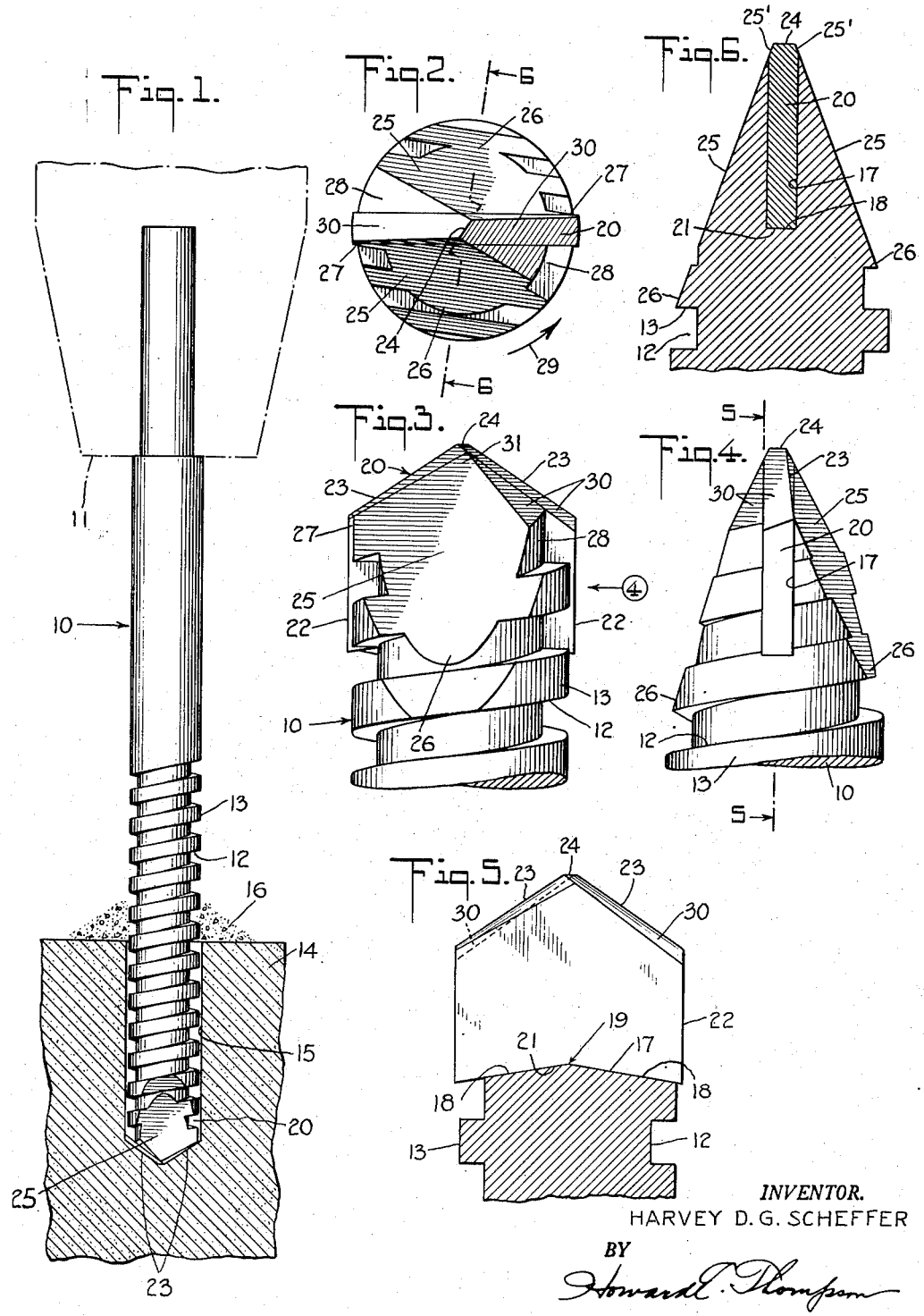
INVENTOR.
HARVEY D. G. SCHEFFER
BY Howard E. Thompson
ATTORNEY Patented Apr. 21, 1953

2,635,856

UNITED STATES PATENT OFFICE 2,635,856

MASONRY DRILL

Harvey D. G. Scheffer, Westfield, N. J., assignor to Diamond Expansion Bolt Company, Garwood, N. J., a corporation of New Jersey Application May 27, 1949, Serial No. 95,669

3 Claims. (Cl. 255—69)

This invention relates to drills, such as used in drilling holes in masonry. More particularly, the invention deals with a tool of this type and kind employing a tip cutter of hard material, thereby rendering drills of this type and kind more efficient in operation. Further, the invention deals with a spirally grooved stock to facilitate automatic displacement of the particles from a drill hole. Still more particularly, the invention deals with a special grinding on the tip end of the stock to reinforce, support and back the cutter tip thereon.

The novel features of the invention will be best understood from the following description when taken together with the accompanying drawing, in which certian embodiments of the invention are disclosed, and in which the separate parts are designated by suitable reference characters in each of the views; and in which:

Fig. 1 is a side view of a drill made according to my invention, diagrammatically illustrating the use thereof.

Fig. 2 is a view looking at the top end of the drill.

Fig. 3 is a side view of the structure as seen in Fig. 2.

Fig. 4 is a view looking in the direction of the arrow 4 of Fig. 3.

Fig. 5 is a section on the line 5—5 of Fig. 4; and

Fig. 6 is a section on the broken line 6—6 of Fig. 2.

In drills of the kind under consideration, where a cutter tip has been disposed upon the end of the drill, difficulty has been experienced in the support of the tip, and further, in guiding the drill in its movement through the workpiece. The latter has been experienced primarily from the freeness of the drill shank in the cut hole, permitting the cutter clearance to move in the direction of the soft spots in the masonry. Furthermore, the gathering of the drill cuttings or particles around the shank, prevent the drilling of deep holes, since these cuttings will pack and bind the drill to the extent that it stops the rotation. These cuttings also hold in the heat decreasing the cutting life of the tip.

It is the purpose of my invention to provide a drill of the character described wherein the shank has a spiral groove formed therein to automatically feed the ground particles or chips out of the hole as the drill passes into the workpiece in forming the hole. Still more particularly, the invention deals with a drill of the character described wherein the shank is ground adjacent the cutter tip, so as to provide supporting and reinforcing walls closely adjacent the cutter edge of said tip, and further, to provide clearance for free passage of the particles into the spiral feed groove of the drill. Another feature of the invention resides in so grinding the drill as to leave a relatively wide contracted cutter end which is disposed approximately ninety degrees to the bevel grinding of the tip end of the drill, as well as said cutter tip. A further feature of the invention resides in milling the drill shank to provide at the bottom of the slot, angularly disposed surfaces forming a key portion on the shank for keying the cutter tip against movement radially of said shank.

In Fig. 1 of the drawing, I have diagrammatically illustrated a use of one of my drills 10, the end of the drill being supported by a suitable drill chuck, indicated in dot and dash outline at 11. The other end portion of the drill shank is fashioned to form a long spiral groove 12, between which is a relatively flat-faced screw thread 13, which acts as a feed screw for feeding particles or cuttings from a workpiece 14 or the hole 15 drilled therein to the surface of the workpiece, as indicated at 16. The free end of the drill has a transverse groove or slit 17, preferably defined by diverging walls 18 to form centrally of the axis of the drill a raised contracted portion 19.

At 20 is shown a drill tip or tool which is preferably composed of an extremely hard substance, such for example, as tungsten carbide, and this tip is of a width to fit snugly in the slot or recess 17 and is silver-soldered or otherwise secured thereto. The inner end of the tip has a flat conical surface 21, note Fig. 5, to fit snugly on the surfaces 18, thus keying the tip or tool against lateral or radial displacement from the shank. This construction provides a secure mounting of the tip or tool at the end of the shank. The tip 20 has parallel side walls 22 which extend beyond the thread 13, in other words, the tip 20 is of greater width than the outside diameter of the thread 13, to provide clearance for the shank. The outer end of the tip has upwardly contracted bevelled cutter edges 23 which terminate in a wide peak end 24, slightly less in width than the thickness of the tip 20, by reason of the ground surfaces, later described.

In grinding the drill, the tip end thereof, at opposed sides of the tip or tool 20, are ground to form long bevelled surfaces 25, which surfaces extend onto the threaded portion of the shank 19, so as to reduce the diameter of the threads materially, at a point inwardly of and adjacent the tip 20, as indicated at 26, in Fig. 6 of the drawing. This reduction of the thread provides free clearance for the chips or cuttings to extend into the feed groove 12 to displace the chips from the hole 15 in the manner indicated in Fig. 1.

Considering Fig. 2 of the drawing, it will appear that the ground surfaces 25 are ground at an angle to the plane of the tip 20, so that these surfaces 25 closely approach the side surfaces of the tip 20, as at 27, whereas relatively heavy stock is provided to back-up the tip 20, as at 28, the drill being rotated in the direction of the arrow 29 of Fig. 2 of the drawing.

In addition to grinding the surfaces, as at 25, the drill is ground for sharpening along the edges 23, as represented by the ground surfaces 30, these grindings extending onto the portions 28, as will appear from a consideration of the right hand side of Fig. 3, and as indicated in Fig. 4. This method of grinding disposes the end 24 of the edges 23 at a slight angle to the opposed surfaces 25, as will appear from a consideration of Fig. 2. It will also be apparent from a consideration of Fig. 3 of the drawing, that the stock of the shank 10 extends to a point on the tip 20 adjacent the end 24, as indicated at 31, the stock of the shank being heaviest between 28 and 31 and relatively thin between 27 and 31, as appearing in Fig. 3 of the drawing. In other words, the cutter edges 23 of the tip or tool are reinforced and backed to a point closely adjacent said edges. By reason of this construction, extremely hard materials, such as tungsten carbide can be successfully used in performing drilling operations of the type and kind under consideration.

It will appear from a consideration of Fig. 6 of the drawing, that the ground surfaces 25 extend onto the tip or tool 20, as indicated at 25'. This reduces the end 24 to some extent, but still maintains a relatively wide end 24 in contrast to the pointed end usually employed in drills of this type and kind.

The ground surfaces 30 are substantially at right angles to the ground surfaces 25, and the tip end 24 extends at an angle of approximately ninety degrees to the surfaces 25. This type of sharpening permits more metal between the ground surfaces than is usually employed, thus providing more metal for heat dissipation and greater strength to the cutting edge, thus extending its cutting life. With a drill of the type and kind under consideration, it will be apparent that the drill can be resharpened or reground to quite an extent, until most of the tip or tool 20 has been consumed. It will thus be apparent that a tool of the kind under consideration becomes highly economical in use. The thread 13 in addition to providing the feed groove 12, also provides a support and guide for the drill in the hole 15 of the workpiece 14 being formed, the thread guiding the tool in its passage into the workpiece. In Fig. 1 of the drawing, clearances have been exaggerated from the standpoint of clarity.

For purposes of description, the slotted end of the drill shank may be termed the drill head and the coacting conical surfaces on the base of the drill head slot and the cutter, tip or tool may be regarded as a conical key seat between the parts. On the other hand, this key construction may be regarded simply as means keying the tool in the head.

Having fully described my invention, what I claim as new and desire to secure by Letters Patent is:

1. A drill of the character described, comprising an elongated shank, one end portion of the shank having a spiral groove extending longitudinally thereof, said end portion of the shank terminating in a transversely slotted drill head, opposed walls of said slot being parallel, a cutter snugly and fixedly secured in the slot of said head and protruding at opposite sides of the head, said cutter having contracted outer ends forming cutter edges, said cutter edges being defined by outwardly and downwardly inclined surfaces, the head end of the shank at opposed sides of the slot having substantially flat tapered side surfaces contracting in the direction of said end of the drill, and the tapered side surfaces of the shank being disposed angularly to the plane of the cutter to dispose a thick wall portion of the head at each side surface of the cutter to reinforce said cutter.

2. A drill of the character described, comprising an elongated shank, one end portion of the shank having a spiral groove extending longitudinally thereof, said end portion of the shank terminating in a transversely slotted drill head, opposed walls of said slot being parallel, a cutter snugly and fixedly secured in the slot of said head and protruding at opposite sides of the head, said cutter having contracted outer ends forming cutter edges, said cutter edges being defined by outwardly and downwardly inclined surfaces, the head end of the shank at opposed sides of the slot having substantially flat tapered side surfaces contracting in the direction of said end of the drill, the tapered side surfaces of the shank being disposed angularly to the plane of the cutter to dispose a thick wall portion of the head at each side surface of the cutter to reinforce said cutter, and the tapered surfaces of the head extending onto the spiral groove portion of the shank inwardly of said cutter.

3. A drill of the character described, comprising an elongated shank, one end portion of the shank having a spiral groove extending longitudinally thereof, said end portion of the shank terminating in a transversely slotted drill head, opposed walls of said slot being parallel, a cutter snugly and fixedly secured in the slot of said head and protruding at opposite sides of the head, said cutter having parallel side surfaces and contracted outer ends forming cutter edges, said cutter edges being defined by outwardly and downwardly inclined surfaces, the head end of the shank at opposed sides of the slot having substantially flat tapered side surfaces contracting in the direction of said end of the drill and disposed angularly to parallel side surfaces of the cutter, said cutter edges being bevelled at an angle of approximately 90° to the tapered side surfaces of the drill head, and the drill head having thick wall portions extending onto opposed sides of the cutter to reinforce and back the cutter.

HARVEY D. G. SCHEFFER.

References Cited in the file of this patent

UNITED STATES PATENTS

| Number | Name | Date |
| --- | --- | --- |
| 994,668 | Childs | June 6, 1911 |
| 1,106,966 | Pauli | Aug. 11, 1914 |
| 1,135,530 | Jopling | Apr. 13, 1915 |
| 1,388,792 | Bernay | Aug. 23, 1921 |
| 2,101,376 | Voigtlander | Dec. 7, 1937 |
| 2,506,474 | Tilden | May 2, 1950 |
| 2,507,221 | Phipps | May 9, 1950 |
| 2,565,333 | Weidman et al. | Aug. 21, 1951 |

FOREIGN PATENTS

| Number | Country | Date |
| --- | --- | --- |
| 375,596 | Great Britain | June 30, 1932 |
| 423,647 | Great Britain | Feb. 5, 1935 |
| 500,147 | Great Britain | Feb. 3, 1939 |
| 363,913 | Germany | Dec. 31, 1931 |
| 584,050 | Germany | Aug. 31, 1933 |